(12) United States Patent
Otsuka

(10) Patent No.: US 8,511,723 B2
(45) Date of Patent: Aug. 20, 2013

(54) LOCKING DEVICE

(75) Inventor: Taiyo Otsuka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 423 days.

(21) Appl. No.: 12/527,909

(22) PCT Filed: Nov. 26, 2007

(86) PCT No.: PCT/JP2007/072737
§ 371 (c)(1),
(2), (4) Date: Sep. 23, 2009

(87) PCT Pub. No.: WO2008/108037
PCT Pub. Date: Sep. 12, 2008

(65) Prior Publication Data
US 2010/0032967 A1 Feb. 11, 2010

(30) Foreign Application Priority Data
Mar. 2, 2007 (JP) .................................. 2007-052538

(51) Int. Cl.
*E05C 3/06* (2006.01)
*B60N 2/00* (2006.01)

(52) U.S. Cl.
USPC ................... 292/216; 296/65.03; 297/378.13; 297/336

(58) Field of Classification Search
USPC .................. 297/336, 378.12, 378.13, 378.14;
296/65.01, 65.03, 65.05, 65.06; 292/196,
292/198, 203, 210, 216, 219, 221, 225–228,
292/11, 56, 113, 215, 240
See application file for complete search history.

(56) References Cited

U.S. PATENT DOCUMENTS 2,595,450 A * 5/1952 Coffing ...................... 294/82.33
5,868,444 A * 2/1999 Brackmann et al. .......... 292/201
(Continued)

FOREIGN PATENT DOCUMENTS

| EP | 1889745 | 2/2008 |
| JP | 2005-7966 | 1/2005 |
| JP | 2005-271903 | 10/2005 |
| WO | 2006/132018 | 12/2006 |

OTHER PUBLICATIONS

English language Abstract of JP 2005-271903, Oct. 6, 2005.

*Primary Examiner* — Carlos Lugo
*Assistant Examiner* — Alyson M Merlino
(74) *Attorney, Agent, or Firm* — Greenblum & Bernstein, P.L.C.

(57) ABSTRACT

A locking device includes a locking mechanism and a striker. The locking mechanism has a base plate, a hook, a pawl, a release lever, a thrust member, a locking spring and a thrust spring. The hook, when rotated, is capable of forming a locked condition in which the striker is held or an unlocked condition. The pawl is rotatably supported via a support shaft as a first shaft and is capable of rotating to a position in which the pawl can engage the hook. The release lever is rotatably supported via a support shaft as a second shaft. The release lever, when applied with a manipulation force for unlocking, is capable of rotating the pawl from the engageable position in a non-engaging direction. The thrust member is rotatably supported via the support shaft and is capable of further pressing the hook in the locked condition toward a locking direction. Further, the support shaft is positioned beyond the support shaft as viewed from an input point of the manipulation force to the release lever.

2 Claims, 7 Drawing Sheets

(56) References Cited

U.S. PATENT DOCUMENTS

| | | | |
|---|---|---|---|
| 6,012,747 A * | 1/2000 | Takamura et al. | 292/216 |
| 6,345,867 B1 * | 2/2002 | Hellrung et al. | 297/336 |
| 6,698,837 B2 * | 3/2004 | Pejathaya et al. | 297/378.12 |
| 6,733,078 B1 * | 5/2004 | Zelmanov | 297/378.1 |
| 6,860,562 B2 * | 3/2005 | Bonk | 297/378.12 |
| 6,991,293 B2 * | 1/2006 | Lang et al. | 297/336 |
| 7,243,974 B2 * | 7/2007 | Kondo et al. | 296/65.03 |
| 7,575,280 B2 * | 8/2009 | Palomba et al. | 297/336 |
| 7,631,907 B2 * | 12/2009 | Sato | 292/216 |
| 7,762,605 B2 * | 7/2010 | Otsuka et al. | 296/65.03 |
| 7,926,858 B2 * | 4/2011 | Otsuka | 292/216 |
| 2005/0104384 A1 | 5/2005 | Kondo et al. | |
| 2005/0269854 A1 * | 12/2005 | Lutzka et al. | 297/378.13 |
| 2007/0080554 A1 * | 4/2007 | Willing et al. | 296/65.03 |
| 2009/0056393 A1 | 3/2009 | Otsuka | |
| 2010/0026013 A1 * | 2/2010 | Otsuka et al. | 292/121 |

* cited by examiner

A-A Cross Section

B-B Cross Section

LOCKING DEVICE

TECHNICAL FIELD

The present invention relates to a locking device that is mainly capable of connecting a vehicle seat to a vehicle body side or disconnecting the same therefrom.

BACKGROUND ART

An example of a locking device of this type is art taught by WO2006/132018. In this art, a locking mechanism is provided to a seat side and a striker is provided to a vehicle body side. The locking mechanism includes a base plate having a recess capable of receiving the striker, a hook, a pawl, a release lever and a thrust member.

The hook is rotatably supported on the base plate, so as to form a locked condition in which the striker is held between the hook and the recess of the base plate or an unlocked condition in which the hook is spaced from the striker. The pawl, the release lever and the thrust member are respectively coaxially rotatably supported on the base plate. The pawl rotates to a condition in which the pawl engages the hook, so as to maintain the hook in the locked condition. The release lever, when applied with a manipulation force for unlocking, rotates the pawl from an engaging position in which the pawl engages the hook in a non-engaging direction. The thrust member further presses the hook placed in the locked condition in a locking direction. Further, the thrust member rotates with the rotation of the pawl in the non-engaging direction.

A locking spring is positioned between the hook and the pawl. The locking spring biases the hook and the pawl such that the hook and the pawl are stabilized at a rotational position corresponding to the locked condition or the unlocked condition. Also, a thrust spring is positioned between the cam and the base plate. The thrust spring biases the thrust member to press the hook in the locking direction, thereby reducing a clearance between the locking mechanism and the striker in the locked condition.

In the art taught by Patent Document 1, both of the release lever and the thrust member are coaxially rotatably supported on the base plate. Therefore, if a rotational angle of the thrust member pressing the hook placed in the locked condition in the locking direction is increased, a rotational angle of the release lever can be increased at the time of unlocking. This may lead to an increased manipulation load. Conversely, if the rotational angle of the release lever is determined so as to fall in a desired angle range, a range (in which the thrust member can press the hook placed in the locked condition) can be reduced. As a result, clearance-absorbing performance to reduce the clearance between the locking mechanism and the striker may be reduced. Therefore, depending on dimension errors of the locking mechanism and the striker or deformation thereof with long-term use, the clearance cannot be reliably reduced.

Further, when the clearance-absorbing performance to reduce the clearance is limited, it is difficult to apply a resin coating to the recess of the base plate and the hook in order to prevent noise generation caused by metal-to-metal contact at the time of locking. The resin coating may have excellent impact noise absorption performance. However, the resin coating may be easily subjected to plastic deformation and wear. Therefore, the clearance between the locking mechanism and the striker can be easily increased, so that the clearance cannot be reliably reduced.

Thus, there is a need in the art to provide increased clearance-absorbing performance to reduce a clearance between a locking mechanism and a striker in a locked condition without increasing a manipulation range of a release lever, so that the clearance can constantly be reliably reduced.

SUMMARY OF THE INVENTION

A first invention is a locking device which includes a locking mechanism provided on one of two members to be engaged with each other, and a striker provided on the other of the two members. The locking mechanism includes a base plate, a hook, a pawl, a release lever, a thrust member, a locking spring and a thrust spring. The base plate has a recess that is capable of receiving the striker. The hook is rotatably supported on the base plate. The hook, when rotated, is capable of forming a locked condition in which the striker is held between the hook and the recess of the base plate or an unlocked condition in which the hook is spaced away from the striker. The pawl is rotatably supported on the base plate via a first shaft. The pawl is capable of rotating to a position in which the pawl can engage the hook and maintaining the hook in the locked condition. The release lever is rotatably supported on the base plate via a second shaft. The release lever, when rotated by a manipulation force for unlocking applied thereto, is capable of rotating the pawl from the position in which the pawl can engage the hook in a non-engaging direction. The thrust member is rotatably supported via the first shaft similar to the pawl. The thrust member is capable of further pressing the hook in the locked condition toward a locking direction and is capable of rotating as the pawl is rotated in the non-engaging direction. The locking spring is capable of biasing the hook and the pawl such that the hook and the pawl are stabilized in the locked condition or the unlocked condition. The thrust spring is capable of biasing the thrust member so as to press the hook in the locking direction.

Further, the second shaft supporting the release lever is positioned beyond the first shaft supporting the pawl and the thrust member as viewed from an input point of the manipulation force to the release lever.

According to this structure, a rotational angle of the thrust member for further pressing the hook in the locked condition toward the locking direction can be set to an increased value while a rotational angle of the release lever about the second shaft is maintained in an original value. Therefore, it is possible to increase clearance-absorbing performance to reduce a clearance produced between the locking mechanism and the striker in the locked condition without increasing a manipulation range of the release lever. Thus, the clearance can be reliably reduced regardless of dimension errors of the locking mechanism and the striker or deformation thereof with long-term use. As a result, it is possible to easily apply a resin coating to the recess of the base plate and the hook in order to prevent noise generation caused by metal-to-metal contact at the time of locking.

A second invention corresponds to the locking device of the first invention, in which when the release lever is rotated about an axis of the second shaft by the manipulation force for unlocking applied thereto, the pawl rotates about an axis of the first shaft via engagement of an engagement hole of the release lever and an engagement protrusion of the pawl. Further, the engagement of the engagement hole and the engagement protrusion can be released when the pawl rotates to the unlocked condition.

According to this structure, even if the manipulation force is excessively applied to the release lever, only the release lever additionally rotates, so that the pawl and the thrust member can be maintained in a desired rotational position.

Therefore, for example, the thrust spring can be prevented from being applied with excessive tension load.

A third invention corresponds to the locking device of the second invention, in which when the pawl rotates about the axis of the first shaft from the position in which the pawl can engage the hook in the non-engaging direction, the engagement protrusion of the pawl contacts the thrust member, so as to rotate the thrust member about the axis of the first shaft in the same direction.

Thus, the engagement protrusion of the pawl may function as a member that permits integral rotation of the pawl and the release lever and a member that permits integral rotation of the pawl and the thrust member. Therefore, the number of the construction elements can be reduced.

A fourth invention corresponds to the locking device of the first invention which further includes a cooperating member that is attached to the second shaft supporting the release lever, so as to rotate with the release lever thereabout. Further, the pawl rotates from the position in which the pawl can engage the hook in the non-engaging direction.

According to this structure, the arrangement of the release lever in the locking mechanism and the shape of the pawl are not substantially restricted. This may lead to increased generality thereof.

A fifth invention corresponds to the locking device of the fourth invention, in which when the release lever and the cooperating member are rotated about an axis of the second shaft by the manipulation force for unlocking applied thereto, the pawl rotates about an axis of the first shaft via engagement of an engagement hole of the cooperating member and an engagement protrusion of the pawl. Further, the engagement of the engagement hole and the engagement protrusion can be released when the pawl rotates to the unlocked condition.

According to this structure, even if the manipulation force is excessively applied to the release lever, only the release lever and the cooperating member additionally rotate, so that the pawl and the thrust member can be maintained in a desired rotational position. Therefore, for example, the thrust spring can be prevented from being applied with excessive tension load.

Figure 1:
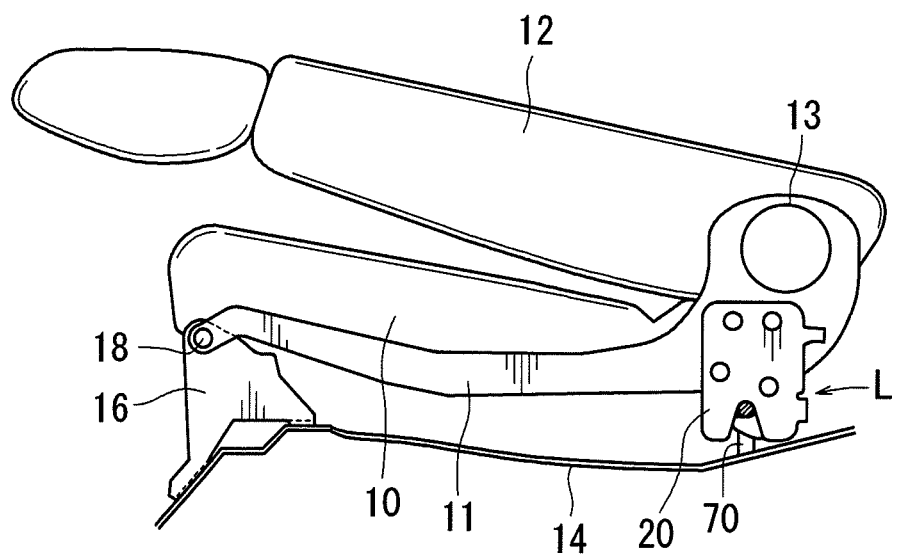
FIG. 1 is a side view of a retractable seat for a vehicle.

DESCRIPTION OF REFERENCE SYMBOLS 10 seat cushion (one of two members)
14 floor (the other of two members)
20 locking mechanism
22 base plate
23 recess
30 hook
46 pawl
50 support shaft (first shaft)
52 lease lever
55 cable connecting portion (input point of manipulation force)
56 locking spring
58 support shaft (second shaft)
60 thrust member
66 thrust spring
70 striker

BEST MODES FOR CARRYING OUT THE INVENTION

In the following, a preferred embodiment for carrying out the present invention will be described with reference to the drawings.

Embodiment 1

First, Embodiment 1 of the present invention will be described with reference to FIG. 1 to FIG. 5.

A seat shown in FIG. 1 is, for example, a rear seat for three. In order to retract a seat of this type, a reclining device 13 is first operated to fold a seat back 12 onto a seat cushion 10 as shown in FIG. 1. At the same time, an unlocking operation is performed in order to unlock a locking device L that connects a rear side lower portion of the seat cushion 10 and a floor 14 side. Thereafter, the seat cushion 10 is rotated using a front side end portion thereof as a fulcrum, so that the entire seat is raised against a back surface of a front seat (not shown).

As a structure for this purpose, the front side end portion of a cushion frame 11 of the seat cushion 10 is connected to a hinge bracket 16 fixed to the floor 14 via a rotation shaft 18. Further, the locking device L connecting the rear side lower portion of the cushion frame 11 and the floor 14 side is generally constructed of a locking mechanism 20 that is positioned at the rear side lower portion (one of two members) of the cushion frame 11, and a striker 70 that is fixed to the floor 14 (the other of the two members). Further, a connection structure that is composed of the hinge bracket 16 and the rotation shaft 18 and the locking device L are respectively disposed on, for example, both sides of the seat.

The locking mechanism 20 shown in FIG. 2 to FIG. 5 is constructed of base plates 22, a hook 30, a canceling plate 40, a pawl 46, a release lever 52 and a thrust member 60.

The base plates 22 (22A and 22B) are arranged in pairs. The base plates 22 (22A and 22B) are connected to each other at desired intervals (FIG. 3), so that the remaining components except for the release lever 52 are positioned therebetween. However, in FIG. 2, FIG. 4 and FIG. 5, the nearer base plate 22 (22B) is omitted.

Basic portions of the base plates 22 (22A and 22B) respectively have the same shape as each other and certain portions thereof have shapes different from each other. Therefore, the base plates 22A and 22B will be distinguished from each other only when the shapes of the certain portions are described. In other case, the base plates 22A and 22B will be generically referred to as the base plates 22.

The base plates 22 are connected to the cushion frame 11 of the seat (FIG. 1). Lower portions of the base plates 22 are provided with recesses 23 that are downwardly opened. The recesses 23 are capable of receiving the striker 70 from an open side thereof. An opening width of the recess is gradually increased downwardly, so as to facilitate receiving of the striker. Peripheries of the recesses 23 are provided with resin coatings 26. The resin coatings 26 are intended to reduce noise generation caused by contacting of the metal base plates 22 and the metal striker 70 at the time of locking, which will be described hereinafter.

Figure 2:
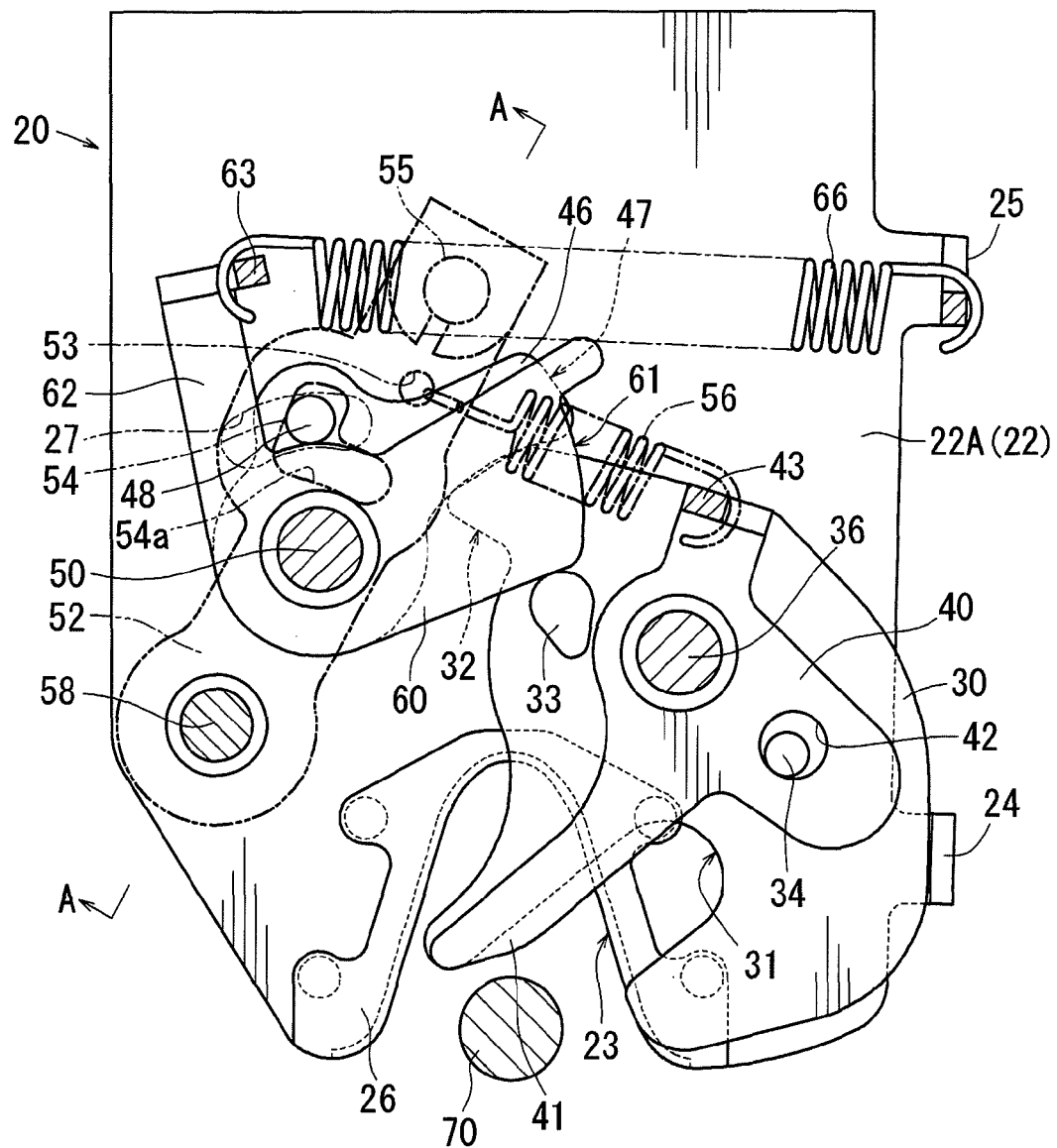
FIG. 2 is a structural view of a locking mechanism according to Embodiment 1, which illustrates an unlocked condition thereof.
Figure 3:
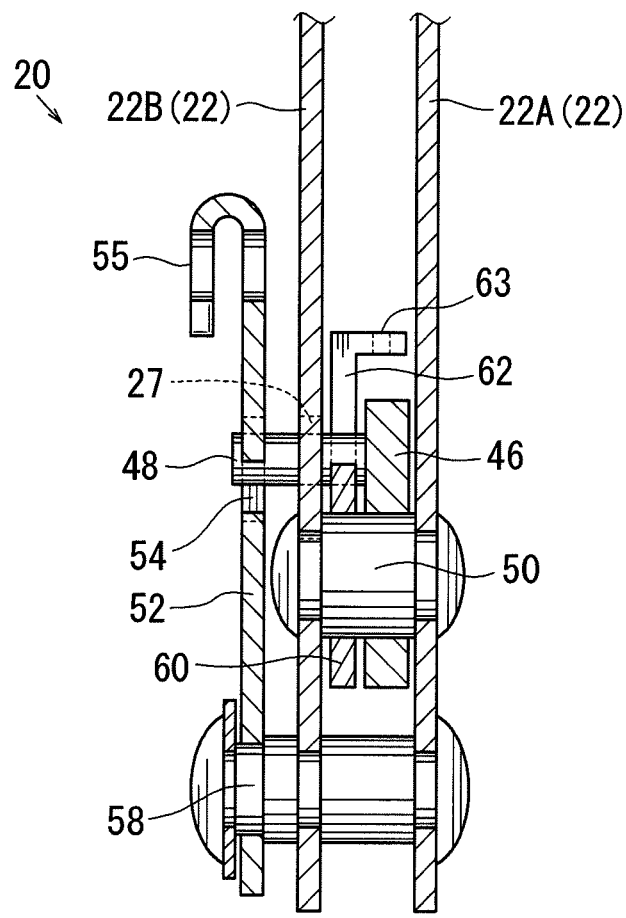
FIG. 3 is a cross-sectional view taken along line A-A in FIG. 2.
Figure 4:
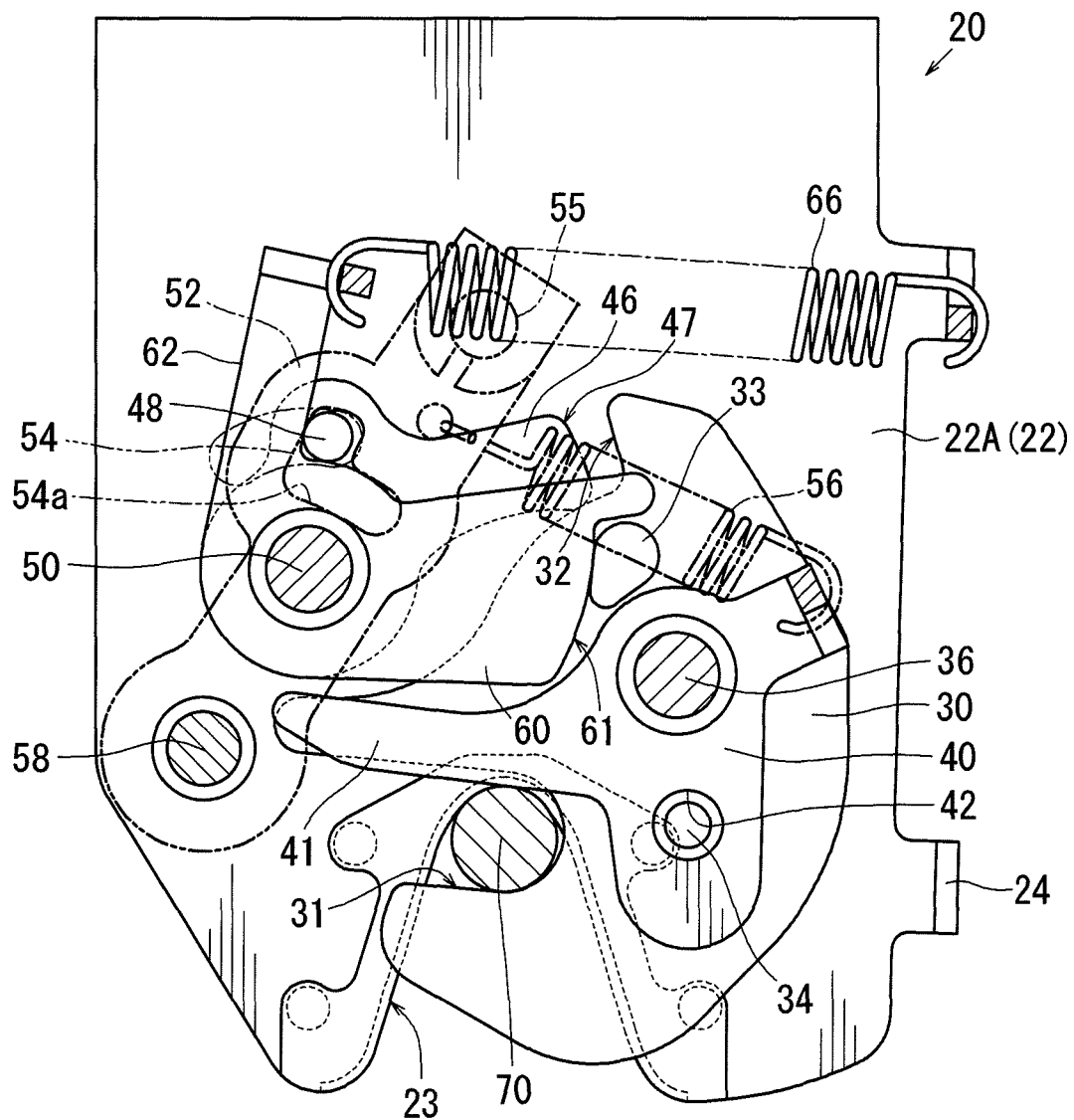
FIG. 4 is a structural view of the locking mechanism according to Embodiment 1, which illustrates an locked condition thereof.
Figure 5:
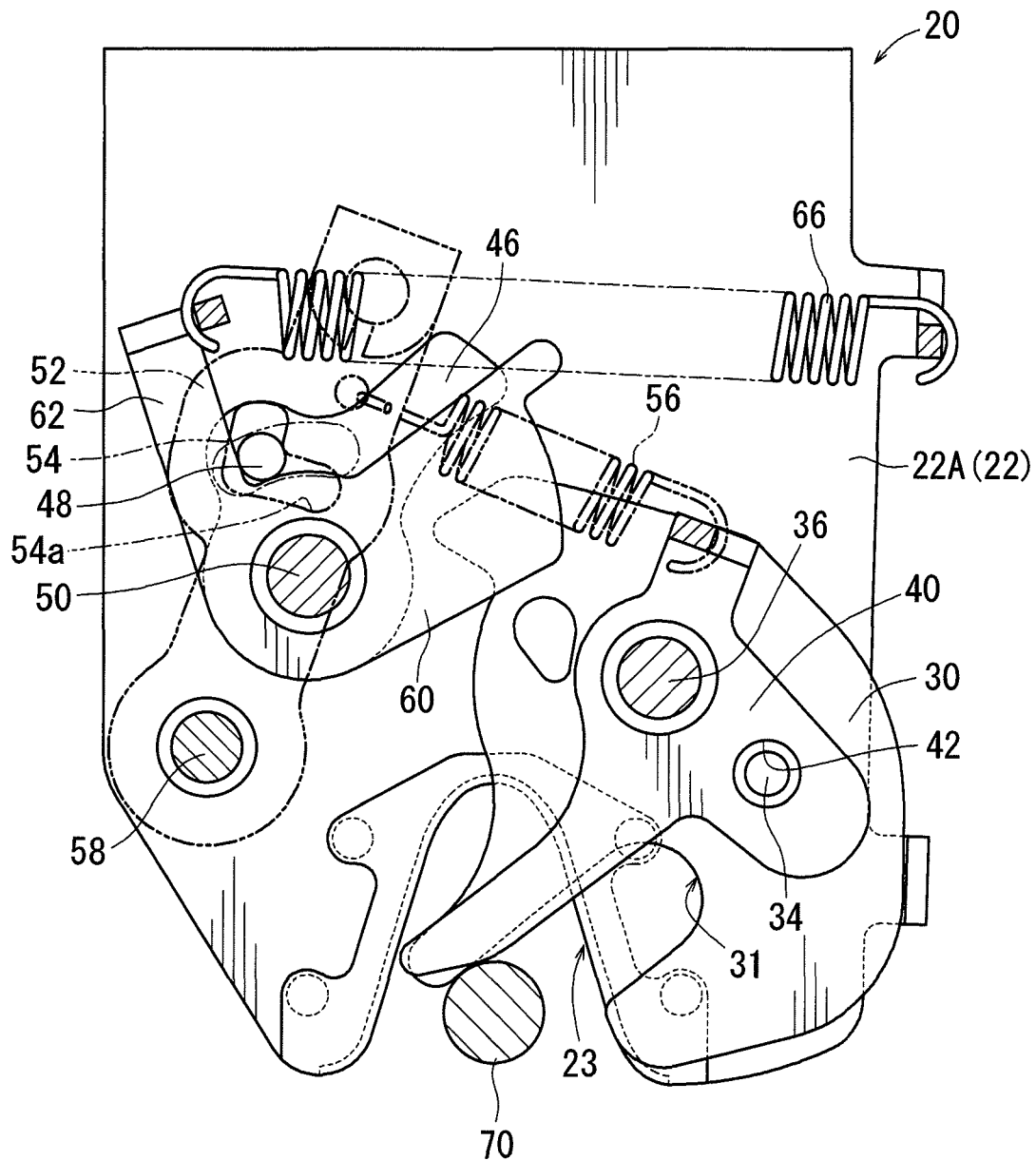
FIG. 5 is a structural view of the locking mechanism according to Embodiment 1, which illustrates a condition in which the locking mechanism is unlocked.

The base plate 22A positioned to the right side in FIG. 3 has a stopper 24 and a spring engagement portion 25 that are formed therein by partly folding a right side periphery thereof (FIG. 2, FIG. 4 and FIG. 5). Conversely, the base plate 22B positioned to the left side in FIG. 3 has a through hole 27 into which a cylindrical engagement projection 48 formed in the pawl 46 is introduced.

The hook 30 and the canceling plate 40 are respectively rotatably attached to a support shaft 36 that is fixed to the base plates 22. The hook 30 has a hook recess 31 that is opened laterally obliquely. When the hook recess 31 engages the striker 70 that is introduced into the recesses 23 of the base plates 22, the striker 70 is held between the hook recess 31 and the recesses 23, so that a locked condition of the locking mechanism 20 is obtained (FIG. 4). The hook 30 has an engagement surface 32 that is formed in a circumferential surface thereof, and a projection 33 that is laterally projected therefrom, which projection is positioned between the engagement surface 32 and the support shaft 36. Also, the hook 30 has a cylindrical protrusion 34 that is laterally projected therefrom similar to the projection 33. The protrusion 34 is positioned opposite to the projection 33 across the support shaft 36. Further, in order to prevent noise generation caused by metal-to-metal contact between the hook 30 and the striker 70 at the time of locking, a periphery of the hook recess 31 can be provided with a resin coating.

The canceling plate 40 has a contacting portion 41 that extends along one of the opposite peripheries of the hook recess 31 of the hook 30, and a spring engagement portion 43 that is formed in an end portion positioned opposite to the contacting portion 41. Also, the canceling plate 40 has a circular engagement hole 42 in which the projection 34 of the hook 30 is loosely introduced. Thus, a clearance is formed between an outer circumferential surface of the projection 34 and an inner circumferential surface of the engagement hole 42, so as to define a movable range in which the canceling plate 40 can rotate relative to the hook 30. Further, after the projection 34 and the engagement hole 42 eccentrically contact each other, the hook 30 and the canceling plate 40 may integrally rotate.

The pawl 46 and the thrust member 60 are respectively rotatably supported on a support shaft 50 (a first shaft) that is attached to the base plates 22. The pawl 46 has an engagement end surface 47 that can contact and push the engagement surface 32 of the hook 30, and an engagement protrusion 48 that passes through the through hole 27 of the base plate 22B and projects outward from the base plate 22B. The engagement protrusion 48 is capable of contacting an arm portion 62 of the thrust member 60 between the base plates 22. The through hole 27 of the base plate 22B has an arcuate shape that is centered at an axis of the support shaft 50, so as to allow the engagement projection 48 to move when the pawl 46 is rotated (FIG. 2, FIG. 4 and FIG. 5).

The thrust member 60 has a contact surface 61 that is capable of contacting the projection 33 of the hook 30. The contact surface 61 is formed in a distal end portion of the thrust member 60. Further, the thrust member 60 has an arm portion 62 that is capable of contacting the engagement protrusion 48 of the pawl 46, and a spring engagement portion 63 that is formed in an end portion of the arm portion 62. A thrust spring 66 constructed of a tension coil spring is positioned between the spring engagement portion 63 and the spring engagement portion 25 of the base plate 22A. The thrust member 60 is biased clockwise in, for example, FIG. 2, about the axis of the support shaft 50 by a spring force of the thrust spring 66.

As will be apparent from FIG. 3, the release lever 52 is positioned outside the base plate 22B. One end portion of the release lever 52 is rotatably supported on a support shaft 58 (a second shaft) that is attached to the base plates 22. The other end portion of the release lever 52 terminates in a cable connecting portion 55 that is folded in a U-shape. The cable connecting portion 55 is connected to one end of a cable (not shown) that is capable of transmitting a manipulation force (a pulling force) for unlocking to the locking mechanism 20. Therefore, the cable connecting portion 55 of the release lever 52 corresponds to "an input point of a manipulation force" of the present invention. Further, the support shaft 58 of the release lever 52 is positioned beyond the support shaft 50 of the pawl 46 and the thrust member 60 as viewed from the cable connecting portion 55.

An engagement hole 54 having an L-shape in planar shape is formed in the release lever 52 at an intermediate position between both end portions thereof. The engagement protrusion 48 of the pawl 46 passes through the through hole 27 of the base plate 22B and is introduced into the engagement hole 54. Also, a spring engagement hole 53 is formed in the release lever 52 at a position adjacent to the engagement hole 54. A locking spring 56 constructed of a tension coil spring is positioned between the spring engagement hole 53 and the spring engagement portion 43 of the canceling plate 40. The canceling plate 40 is biased counterclockwise in, for example, FIG. 2 by a spring force of the locking spring 56, and at the same time, the release lever 52 is biased clockwise in FIG. 2 by the spring force.

Next, a function of the locking device L will be described.

First, the locking mechanism 20 is in an unlocked condition shown in FIG. 2. As previously described, the canceling plate 40 is biased counterclockwise in FIG. 2 due to the spring force of the locking spring 56, so that the engagement hole 42 of the canceling plate 40 and the projection 34 of the hook 30 eccentrically contact each other. Therefore, the hook 30 is also biased counterclockwise via the canceling plate 40. At this time, the circumferential surface of the hook 30 contacts the stopper 24 of the base plate 22A, so that a biasing force applied to the hook 30 can be absorbed. Conversely, the release lever 52 is biased clockwise in FIG. 2 due to the spring force of the locking spring 56, so that the engagement hole 54 formed therein and the engagement protrusion 48 of the pawl 46 engage each other. Thus, the pawl 46 is also biased clockwise via the release lever 52. At this time, a distal end of the pawl 46 contacts the circumferential surface of the hook 30, so that a biasing force applied to the pawl 46 can be absorbed.

Also, the thrust member 60 is biased clockwise in FIG. 2 due to the spring force of the thrust spring 66. At this time, one end portion of the thrust member 60 contacts the projection 33 of the hook 30, so that a biasing force applied to the thrust member 60 can be absorbed.

As shown in FIG. 1, in the unlocked condition, when the seat cushion 10 is moved to be set in the floor 14 side, the striker 70 positioned on the floor 14 side relatively enters the recesses 23 formed in the base plates 22 of the locking mechanism 20. Because of the entering of the striker 70, the hook recess 31 of the hook 30 engages the striker 70 and at the same time, the contacting portion 41 of the canceling plate 40 contacts the striker 70. As a result, a force can be applied to the hook 30 and the canceling plate 40 to rotate the same about an axis of the support shaft 36. Thus, the hook 30 and the canceling plate 40 are rotated clockwise against the spring force of the locking spring 56, so that the locked condition shown in FIG. 4 is obtained.

As previously described, the pawl 46 is biased clockwise via the release lever 52 due to the spring force of the locking spring 56. The biasing force applied to the pawl 46 can be absorbed by the hook 30. Therefore, as the hook 30 rotates, the pawl 46 rotates about the axis of the support shaft 50. As a result, the engagement end surface 47 thereof can be positioned so as to be capable of contacting the engagement surface 32 of the hook 30. Further, upon rotation of the pawl 46, the release lever 52 rotates clockwise about an axis of the support shaft 58 due to the spring force of the locking spring 56.

As described above, the thrust member 60 is rotated clockwise due to the spring force of the thrust spring 66 and the biasing force applied to the thrust member 60 can be absorbed by the projection 33 of the hook 30. Therefore, as the hook 30 rotates, the thrust member 60 also rotates about the axis of the support shaft 50. As a result, the contact surface 61 thereof pushes the projection 33 of the hook 30, thereby further rotating the hook 30 clockwise. A pressure angle is defined in the contact surface 61 of the thrust member 60, so as to apply a clockwise biasing force to the hook 30. As a result, the striker 70 can be thrust into the recesses 23 of the base plates 22 (FIG. 4). Therefore, the striker 70 is firmly held between the recesses 23 of the base plates 22 and the hook recess 31 of the hook 30, so that a clearance produced between the locking mechanism 20 and the striker 70 can be eliminated.

In such a thrusting condition, although the engagement surface 32 of the hook 30 is spaced away from the engagement end surface 47 of the pawl 46, they are placed in a position that is capable of contacting each other. Therefore, when a large load is generated in a direction in which the striker 70 is disengaged from the recesses 23 of the base plate 22 and a portion of the thrust member 60 can be deformed, the engagement surface 32 of the hook 30 contacts the engagement end surface 47 of the pawl 46. As a result, a clearance elimination function for eliminating the clearance between the locking mechanism 20 and the striker 70 is canceled. However, the locking mechanism 20 is maintained in the locked condition. In this way, when a load having a predetermined value or more is exerted between the locking mechanism 20 and the striker 70 in the locked condition, the portion of the thrust member 60 can be deformed before any other portions contained in a transmission route of the load are deformed. As a result, main portions of the locking mechanism 20 can be prevented from deforming, so that the original locking function can be maintained.

When the hook 30 is in a locked position shown in FIG. 4, the spring force of the locking spring 56 functions to rotate the canceling plate 40 counterclockwise. At this time, the contacting portion 41 of the canceling plate 40 contacts the striker 70, so that a rotational position of the canceling plate 40 can be determined. In this condition, the projection 34 of the hook 30 and the engagement hole 42 of the canceling plate 40 is positioned so as to have an annular clearance therebetween.

That is, the canceling plate 40 is capable of rotating relative to the hook 30 within a range corresponding to the clearance. As a result, the spring force of the locking spring 56 acts on only the canceling plate 40 and does not act on the hook 30. Therefore, the spring force of the thrust spring 66 can be freely determined independently of the spring force of the locking spring 56 provided that the thrust spring 66 can bias the thrust member 60 to press the hook 30 toward a locking direction against the spring force of the locking spring 56.

Next, an unlocking operation of the locking mechanism 20 will be described.

When the unlocking operation is performed, the cable connecting portion 55 of the release lever 52 is pulled leftward in FIG. 3 by the cable. As a result, the release lever 52 rotates counterclockwise about the axis of the support shaft 58 against the spring force of the locking spring 56. Therefore, the pawl 46 rotates counterclockwise about the axis of the support shaft 50 via the engagement of the engagement hole 54 of the release lever 52 and the engagement protrusion 48 of the pawl 46. At the same time, the engagement protrusion 48 of the pawl 46 interferes with the arm portion 62 of the thrust member 60, so as to rotate the thrust member 60 in the same direction. Therefore, the engagement end surface 47 of the pawl 46 is displaced from the position in which the engagement end surface 47 is capable of contacting the engagement surface 32 of the hook 30. At the same time, the thrust member 60 rotates against the spring force of the thrust spring 66, so that the contact surface 61 thereof is disengaged from the projection 33 of the hook 30 (FIG. 5). As a result, the hook 30 rotates to the condition shown in FIG. 5 with the canceling plate 40, so that the engagement between the hook 30 and the striker 70 can be released. Thus, the locking mechanism 20 is changed to the unlocked condition.

Further, in the condition shown in FIG. 5, when the manipulation force for unlocking applied to the release lever 52 is canceled, the pawl 46, the thrust member 60 and the release lever 52 are respectively returned to and maintained in a rotational position shown in FIG. 2. Further, when the release lever 52 is further rotated counterclockwise from the condition shown in FIG. 5, the engagement protrusion 48 of the pawl 46 is positioned in a relief portion 54a formed in the engagement hole 54. As a result, the engagement of the engagement hole 54 and the engagement protrusion 48 is released, so that a rotational force of the release lever 52 can be absorbed. Therefore, even if the manipulation force is excessively applied to the release lever 52, only the release lever 52 rotates, so that the pawl 46 and the thrust member 60 are returned to the rotational position shown in FIG. 2.

As previously described, the support shaft 58 that functions as a rotational axis of the release lever 52 is positioned beyond the support shaft 50 of the pawl 46 and the thrust member 60 as viewed from the cable connecting portion 55 that functions the input point of the manipulation force. Therefore, in the release lever 52, a distance between the axis of the support shaft 50 and the cable connecting portion 55 can be increased compared with the conventional locking mechanism. As a result, a rotational angle of the thrust member 60 about the support shaft 50 can be set to an increased value (for example, 29.4 degrees) while a rotational angle of the release lever 52 about the support shaft 58 via the cable is maintained in an original value (for example, 13.2 degrees). Therefore, it is possible to increase a thrusting amount to press the hook 30 positioned in a locked condition in the locking direction by the thrust member 60 without increasing a manipulation range of the release lever 52. As a result, it is possible to provide increased clearance-absorbing performance to reduce the clearance produced between the locking mechanism 20 and the striker 70 in the locked condition, so that the clearance can be reliably reduced.

Further, as previously described, the resin coatings 26 of the base plates 22 or the resin coating (not shown) applied to the hook 30 are useful to eliminate the noise generation caused by metal-to-metal contact at the time of locking. However, such resin coatings may be easily subjected to plastic deformation and wear. Such plastic deformation and wear may increase the clearance produced between the locking mechanism 20 and the striker 70. However, the increased clearance can be absorbed because the thrusting amount of the hook 30 is increased. As a result, the resin coatings 26 or other such coatings can be easily used.

Embodiment 2

Next, Embodiment 2 of the present invention will be described with reference to FIG. 6 and FIG. 7.

Figure 6:
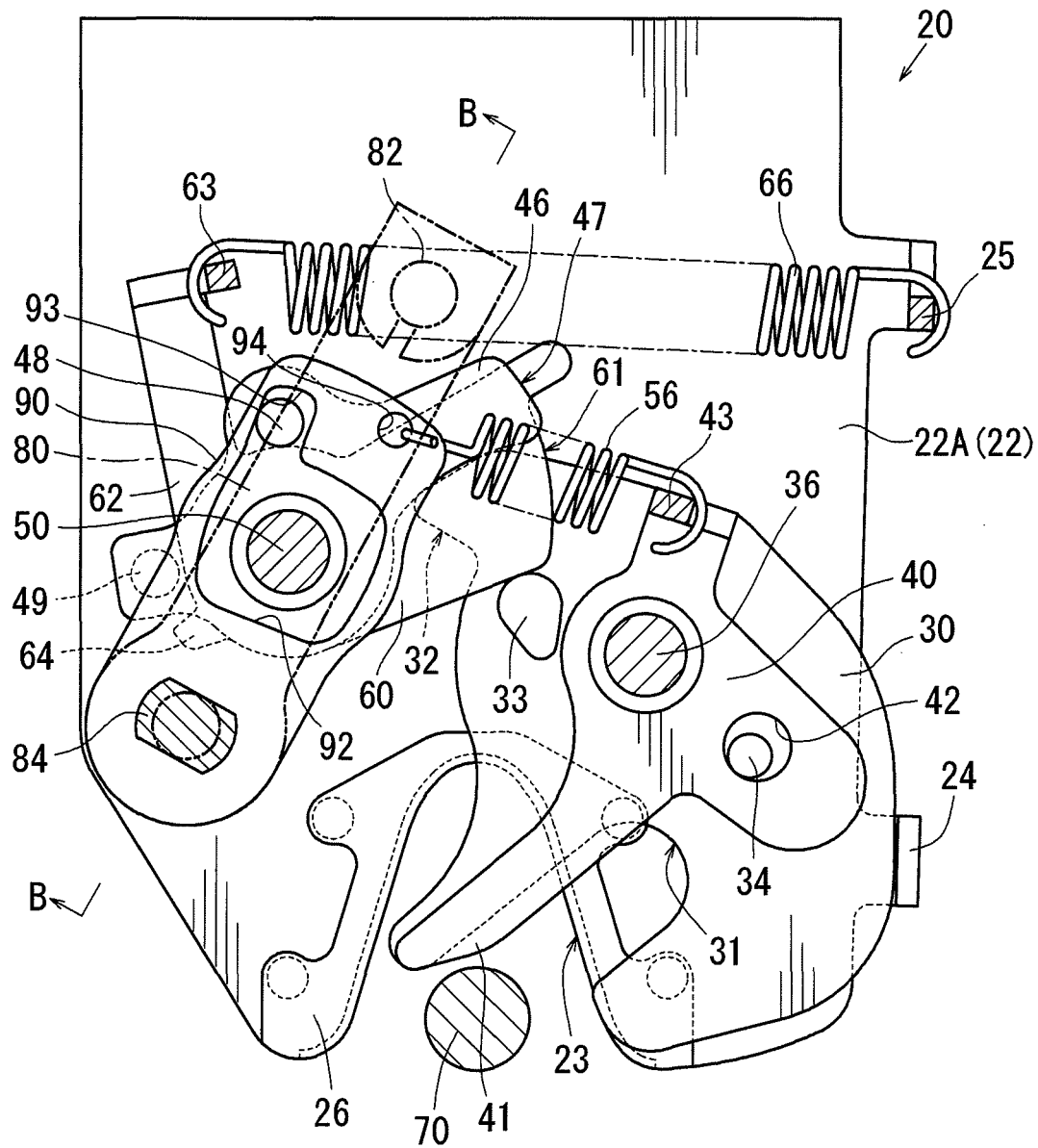
FIG. 6 is a structural view of a locking mechanism according to Embodiment 2, which illustrates an unlocked condition thereof.
Figure 7:
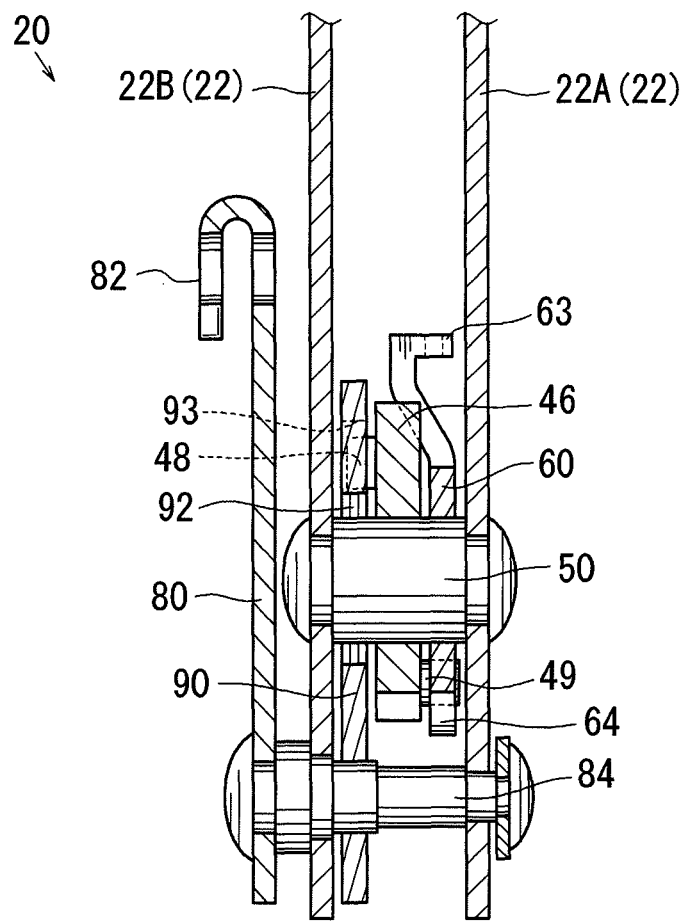
FIG. 7 is a cross-sectional view taken along line B-B in FIG. 6.

As will be apparent from FIG. 6 and FIG. 7, in the locking mechanism 20 of Embodiment 2, the release lever 52 of Embodiment 1 is mainly modified. That is, one end portion of a release lever 80 of Embodiment 2 is attached to a support shaft 84 (the second shaft) that is rotatably attached to the base plates 22, so as to rotate therewith. Similar to the release lever 52, the other end portion of the release lever 80 terminates in a cable connecting portion 82 that is folded in a U-shape. Further, similar to the release lever 52 of Embodiment 1, the release lever 80 is positioned outside the base plate 22B (FIG. 7).

A cooperating member 90 that is capable of sharing functions of the release lever 80 is disposed between the base plates 22 together with the pawl 46 and the thrust member 60. One end portion of the cooperating member 90 is attached to the support shaft 84, so as to rotate therewith. Therefore, the release lever 80 and the cooperating member 90 can integrally rotate via the support shaft 84. The locking spring 56 is positioned between a spring engagement hole 94 formed in the other end portion of the cooperating member 90 and the spring engagement portion 43 of the canceling plate 40. The canceling plate 40 is biased counterclockwise in FIG. 6 about the axis of the support shaft 36 due to the locking spring 56 and at the same time, the cooperating member 90 (the release lever 80) is biased clockwise about an axis of the support shaft 84.

The cooperating member 90 has a through opening 92 into which the support shaft 50 (the first shaft) supporting the pawl 46 and the thrust member 60 is inserted. The opening 92 is determined so as to not interfere with the support shaft 50 even when the cooperating member 90 rotates about the axis of the support shaft 84.

A portion of the opening 92 is constructed as an engagement hole 93 into which the engagement protrusion 48 of the pawl 46 is inserted. Because the cooperating member 90 is biased clockwise in FIG. 6 due to the spring force of the locking spring 56, the engagement hole 93 and the engagement protrusion 48 of the pawl 46 is engaging with each other. Further, a remaining portion except for the engagement hole 93 of the opening 92 corresponds to the relief portion 54a of the engagement hole 54 of Embodiment 1.

Because the cooperating member 90 is positioned adjacent to the pawl 46 as described above, the thrust member 60 is positioned opposite to the cooperating member 90 with interleaving the pawl 46 therebetween (FIG. 7). Therefore, an additional protrusion 49 is formed in the pawl 46. The additional protrusion 49 is projected opposite to the engagement protrusion 48 and is capable of interfering with a projection strip 64 formed in the thrust member 60.

In Embodiment 2, when the unlocking operation is performed, the cooperating member 90 and the release lever 80 are rotated counterclockwise about the axis of the support shaft 84 against the spring force of the locking spring 56. As a result, the pawl 46 rotates counterclockwise about the axis of the support shaft 50 via engagement of the engagement hole 93 of the cooperating member 90 and the engagement protrusion 48 of the pawl 46. At the same time, the additional protrusion 49 of the pawl 46 interferes with the projection strip 64 of the thrust member 60, so as to rotate the thrust member 60 in the same direction.

Further, when the release lever 80 and the cooperating member 90 are excessively rotated, the engagement protrusion 48 of the pawl 46 is shifted to the remaining portion from the engagement hole 93 of the opening 92 of the cooperating member 90. As a result, the engagement of the engagement hole 93 and the engagement protrusion 48 is released, so that a rotational force of the cooperation member 90 can be absorbed. Therefore, only the release lever 80 and the cooperating member 90 rotate, so that the pawl 46 and the thrust member 60 are maintained in the rotational position shown in FIG. 6.

The locking mechanism 20 of Embodiment 2 includes the cooperating member 90 that is separated from the release lever 80. Further, the opening 92 (the engagement hole 93) and the spring engagement hole 94 of the locking spring 56 are formed in the cooperating member 90. Therefore, the release lever 80 can be structurally simplified. As a result, it is not necessary to specially modify the release lever 80 in shape or the like. This may lead to increased generality thereof. Also, the locking spring 56 can be disposed between the base plates 22 with the cooperating member 90.

Further, the locking mechanism 20 in the locked condition and the unlocked condition may have the same function as Embodiment 1 except for the above-described function.

The preferred embodiment for carrying out the present invention have been described with reference to the drawings. However, the embodiment can be easily changed or modified without departing from the gist of the present invention.

For example, in the present embodiment, the seat cushion 10 of the retractable seat and the floor 14 are exemplified as the two members that respectively have the locking mechanism 20 and the striker 70. However, they can be replaced with any two members that require locking and unlocking by the locking device L.

The invention claimed is:

1. A locking device, comprising:
   a locking mechanism provided on one of two members to be engaged with each other; and
   a striker provided on the other of the two members,
   wherein the locking mechanism comprises base plates, a hook, a pawl, a release lever, a thrust member, a locking spring and a thrust spring,
   wherein at least one of the base plates has a recess that is capable of receiving the striker,
   wherein the hook is rotatably supported on at least one of the base plates,
   wherein the hook, when rotated, is capable of forming one of a locked condition in which the striker is held between the hook and the recess of the at least one of the base plates and an unlocked condition in which the hook is spaced away from the striker,
   wherein the pawl is rotatably supported on at least one of the base plates via a first shaft,
   wherein the pawl is capable of rotating to a position in which the pawl can engage the hook to maintain the hook in the locked condition,
   wherein the release lever is rotatably supported on at least one of the base plates via a second shaft, and a cooperating member is attached to the second shaft supporting the release lever, so as to rotate with the release lever thereabout,
   wherein the release lever, when rotated by a manipulation force for unlocking applied thereto, is capable of rotating the pawl in a non-engaging direction from the position in which the pawl can engage the hook,
   wherein the thrust member is rotatably supported on the first shaft similar to the pawl, wherein the thrust member is configured to be rotatable so as to contact and press the hook toward a locking direction and into the locked condition, and is capable of rotating as the pawl is rotated in the non-engaging direction, wherein the locking spring is capable of biasing the hook and the pawl such that the hook and the pawl are stabilized in one of the locked condition and the unlocked condition, wherein the thrust spring is capable of biasing the thrust member so as to press the hook in the locking direction, wherein the second shaft supporting the release lever is positioned beyond the first shaft supporting the pawl and the thrust member as viewed from an input point of the manipulation force to the release lever, wherein when the release lever and the cooperating member are rotated about an axis of the second shaft by the manipulation force for unlocking applied thereto, the pawl rotates about an axis of the first shaft via engagement of an engagement hole of the cooperating member and an engagement protrusion of the pawl, and wherein when the pawl is rotated to place the hook in the unlocked condition, the engagement of the engagement hole and the engagement protrusion can be released such that the engagement protrusion can be positioned in a relief portion of the engagement hole.

2. A locking device, comprising:

a locking mechanism provided on one of two members to be engaged with each other; and a striker provided on the other of the two members, wherein the locking mechanism comprises base plates, a hook, a pawl, a release lever, a thrust member, a locking spring and a thrust spring, wherein at least one of the base plates has a recess that is capable of receiving the striker, wherein the hook is rotatably supported on at least one of the base plates, wherein the hook, when rotated, is capable of forming one of a locked condition in which the striker is held between the hook and the recess of the at least one of the base plates and an unlocked condition in which the hook is spaced away from the striker, wherein the pawl is rotatably supported on at least one of the base plates via a first shaft, wherein the pawl is capable of rotating to a position in which the pawl can engage the hook to maintain the hook in the locked condition, wherein the release lever is rotatably supported on at least one of the base plates via a second shaft, wherein the release lever, when rotated by a manipulation force for unlocking applied thereto, is capable of rotating the pawl in a non-engaging direction from the position in which the pawl can engage the hook, wherein the thrust member is rotatably supported on the first shaft similar to the pawl, wherein the thrust member is configured to be rotatable so as to contact and press the hook toward a locking direction and into the locked condition, and is capable of rotating as the pawl is rotated in the non-engaging direction, wherein the locking spring is capable of biasing the hook and the pawl such that the hook and the pawl are stabilized in one of the locked condition and the unlocked condition, wherein the thrust spring is capable of biasing the thrust member so as to press the hook in the locking direction, wherein the second shaft supporting the release lever is positioned beyond the first shaft supporting the pawl and the thrust member as viewed from an input point of the manipulation force to the release lever, wherein when the release lever is rotated about an axis of the second shaft by the manipulation force for unlocking applied thereto, the pawl rotates about an axis of the first shaft via engagement of an engagement hole of the release lever and an engagement protrusion of the pawl, wherein the engagement of the engagement hole and the engagement protrusion can be released such that the engagement protrusion can be positioned in a relief portion of the engagement hole when the pawl is rotated to place the hook in the unlocked condition, and wherein when the pawl rotates about the axis of the first shaft from the position in which the pawl can engage the hook in the non-engaging direction, the engagement protrusion of the pawl contacts the thrust member, so as to rotate the thrust member about the axis of the first shaft in the same direction.

* * * * *